United States Patent [19]
Lee

[11] Patent Number: 5,927,183
[45] Date of Patent: Jul. 27, 1999

[54] POT HAVING AUTOMATIC SEALING FUNCTION

[75] Inventor: Won-Myung Lee, Northvale, N.J.

[73] Assignee: Deuk-Man Kim, Seoul, Rep. of Korea; a part interest

[21] Appl. No.: 09/068,892

[22] PCT Filed: Nov. 29, 1996

[86] PCT No.: PCT/KR96/00219

§ 371 Date: May 22, 1998

§ 102(e) Date: May 22, 1998

[87] PCT Pub. No.: WO97/19626

PCT Pub. Date: Jun. 5, 1997

[30] Foreign Application Priority Data

Nov. 29, 1995 [KR] Rep. of Korea .................. 95-36630

[51] Int. Cl.[6] .................. A47J 27/08; A47J 27/082; A47J 27/09; A47J 27/092
[52] U.S. Cl. .................. 99/337; 99/403; 220/316; 220/912
[58] Field of Search .................. 99/337, 338, 330, 99/342, 403, 407, 340, 449; 220/208, 316, 314, 325, 326, 912, 324; 126/377, 378, 373, 374, 389, 388, 369; 292/256

[56] References Cited

U.S. PATENT DOCUMENTS 5,317,959  6/1994  Beluzzi .
5,427,014  6/1995  Von Der Becke et al. .............. 99/337
5,442,998  8/1995  Niese .
5,613,424  3/1997  Chameroy et al. ....................... 99/337
5,701,805  12/1997  Sa ........................................ 99/403 X

FOREIGN PATENT DOCUMENTS 0 247 406  12/1987  European Pat. Off. .
0 651 962  5/1995  European Pat. Off. .

Primary Examiner—Timothy F. Simone
Attorney, Agent, or Firm—Browdy and Neimark

[57] ABSTRACT

A pot having an automatic sealing function for heating and cooking food material is disclosed. In the pot having the construction that a lid (20) to which a knob (3) is assembled is installed on the upper part of a vessel (10) whose upper part is opened, it includes an elastic open seal part (40) installed between the lid (20) and the knob (30) so that high pressure generated in heating is automatically exhausted, simultaneously exterior air cannot flow in when the pot is cooled, and thereby the pot interior can be automatically sealed; a sealing part (50) installed between the vessel (10) and the lid (20); and an inverse outflow cut-off flange (60) installed on the lower part of the lid (20), for restraining an outflow of the food material to the exterior of the vessel when contents are boiled.

11 Claims, 3 Drawing Sheets

POT HAVING AUTOMATIC SEALING FUNCTION

BACKGROUND OF THE INVENTION

1. Technical Field

The present invention relates to a pot for heating and cooking food material, and more particularly to a pot having a lid for exhausting high pressure generated by heating, and automatically sealing the pot interior when heating ceases so as to maintain food material for long time without decomposition. The pot also has edge packing and an inverse flange on the lid to seal against outside air and preclude effluence of food material to the outside of the pot when boiled.

2. Prior Art

Generally, a pot is constructed simply by a vessel and a lid, and is used for cooking soup, stew etc. Rising interior pressure due to heating the pot is exhausted by an exhaust hole formed on the lid or a crack between the vessel and the lid so that an overflow of the food material can be prevented. However, since boiled soup can flow out through the crack, and the soup will push out the lid and overflow outside, this may cause problems such as contamination of the vessel contamination or extinguishing of the heating source. Further, the exhaust hole or the crack between the lid and the vessel promotes decomposition of the food within the pot.

DISCLOSURE OF THE INVENTION

Accordingly, the present invention is directed to a pot having an automatic sealing function that substantially obviates one or more of the problems due to limitations and disadvantages of the prior art.

An object of the present invention is to provide a pot having an automatic sealing function.

Additional features and advantages of the invention will be set forth in the description which follows, and in part will be apparent from the description, or may be learned by practice of the invention. The objectives and other advantages of the invention will be realized and attained by the structure particularly pointed out in the written description as well as the appended drawings.

To achieve these and other advantages and in accordance with the purpose of the present invention, as embodied and broadly described, a pot having the automatic sealing function is characterized in automatically exhausting high pressure generated in heating and simultaneously automatically sealing the pot interior when heating is stopped and the pot cools so that the food within can be kept for a long time without deposition, and minimizing an overflow of contents material in boiling the contents material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings.

In the drawings.

DETAILED DESCRIPTION OF THE PREFERRED EMBODIMENT(S) OF THE INVENTION

Reference will now be made in detail to the preferred embodiments of the present invention, examples of which are illustrated in the accompanying drawings.

Figure 1:
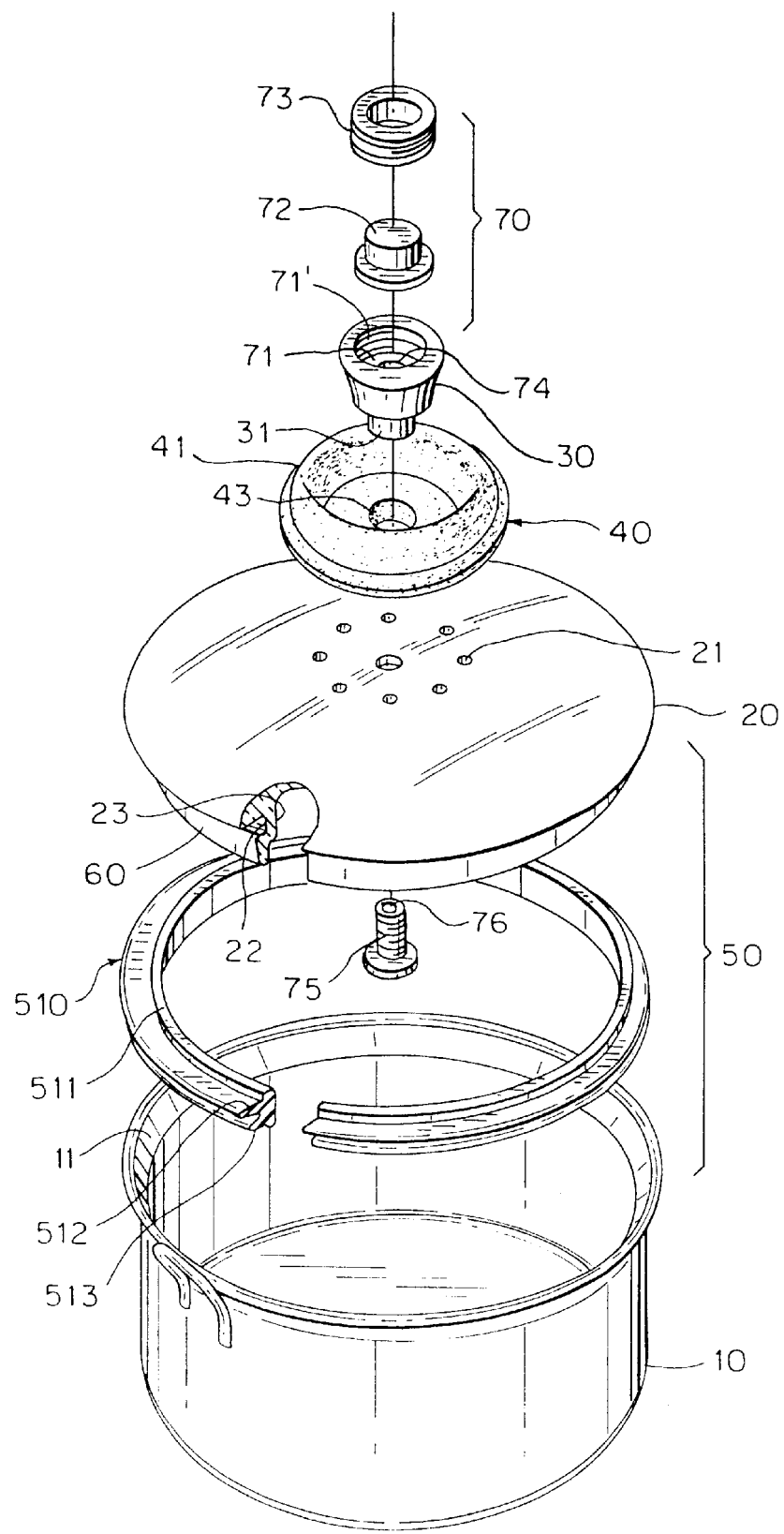
FIG. 1 is an exploded perspective view showing elements of the pot of the present invention.
Figure 2:
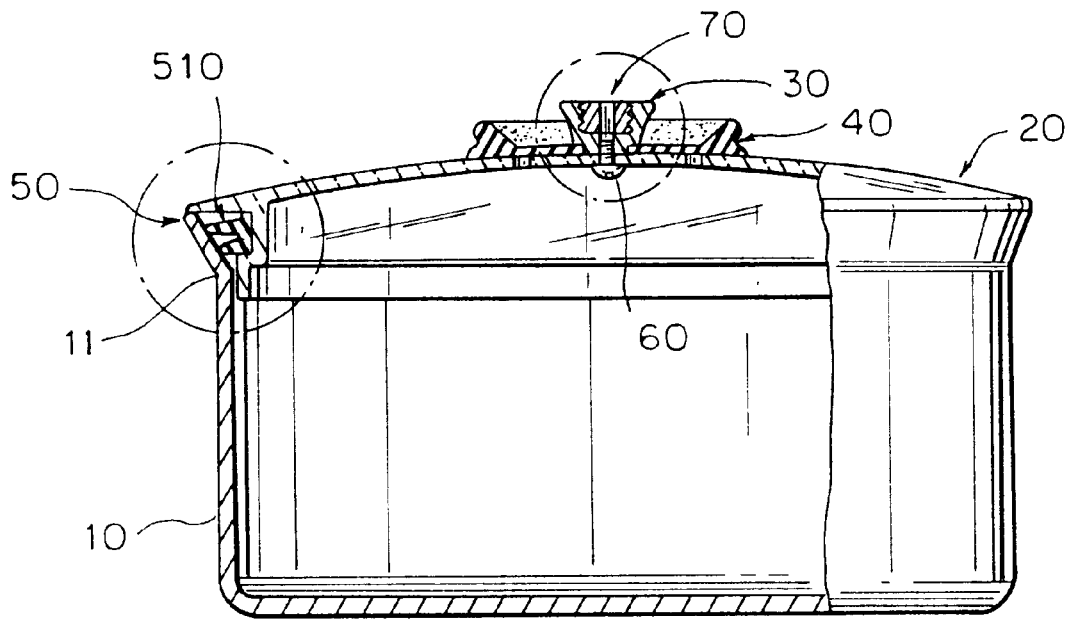
FIG. 2 is a partial sectional view showing a combined state of the pot according to the present invention.

FIGS. 1 to 5 are embodiments of the present invention. FIG. 1 shows a pot having a vessel 10 whose upper part is opened and a lid 20. A knob 30 including a seal indication structure 70 is installed on the lid 20. An elastic open seal part 40 is installed between the lid 20 and the knob 30, and an elastic sealing assembly 50 is installed between the vessel 10 and the lid 20. In this pot, the high pressure generated by heating is automatically sealed so that exterior air cannot flow into the pot when cooling. This sealed state can be easily identified from the outside, and an overflow of the food can be minimized. On the lid 20 numerous exhaust holes 21 are pierced around the circumference of knob 30 so as to be opened and closed by the open seal part 40. The lid 20 and the knob 30 are assembled by an assembly screw 75 so as to be fixed in one body. On a central lower part of the knob 30 a projected rod 31 is formed in a projected shape and is inserted by force into a hole 43 formed on the center of the open seal part 40, and simultaneously is assembled so that an upper face of the open seal part 40 can be engaged to a lower face of the knob 30 so as not to leak.

Figure 3:
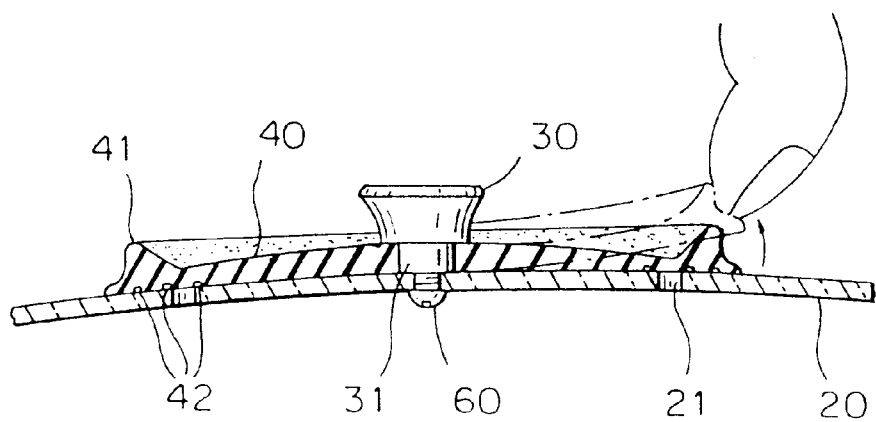
FIG. 3 is a partial sectional view showing the opening of the seal part on the lid of the pot of the present invention.

The open seal part 40 is constructed by elastic synthetic resin or rubber material capable of enduring high heat, and having a construction that, the further the distance from the center to an outer side, the thinner part 40 becomes, thereby so as to be easily elastically lifted smoothly when high pressure is exhausted through exhaust holes 21. On an outer circumference part of the upper face of the open seal part 40 a handle part 41 having a ring shape is formed, which slants up in the outer direction. When the pot is in a sealed state, to open the lid 20, as shown in FIG. 3 the handle part 41 is pulled to open the exhaust holes 21 permitting exterior air to flow into the vessel 10 and release a sealed compression state of the lid 20 so the lid is opened easily. On the lower face of the open seal part 40, a numerous number of inflow holes 42 are formed in a concave circle shape, and in a case of opening of the open seal part 40, the inflow holes 42 helps smooth separation and simultaneously helps staining substances adhering on the lid 20 to be contained in the inflow holes 42 inside so that the lower face of the open seal part 40 can adhere exactly to the lid 20.

The sealing part assembly 50 has a slant face 11 being directed to an outer side on the upper end of the vessel 10. Also, on the lower part of an outer circumference face of the lid 20 a projection jaw 23 is formed so that a circular insert flute 22 is formed. A packing 510 of an elastic ring shape is inserted into the insert flute 22 so that packing 510 can adhere closely to the slant face 11 by friction and low pressure.

Figure 4:
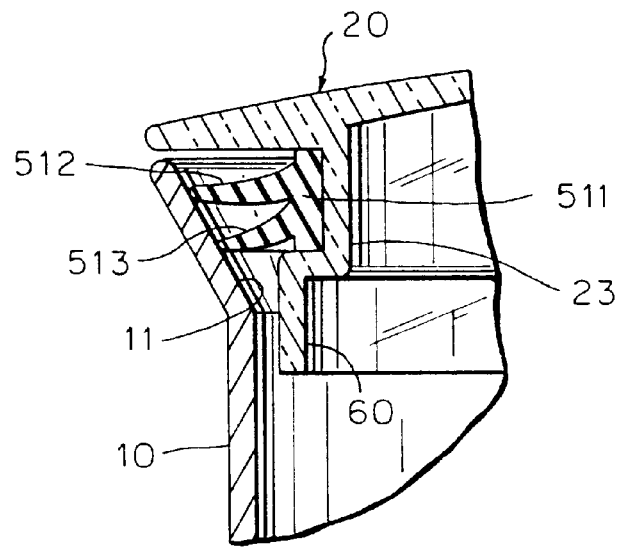
FIG. 4 is a partial sectional view showing the construction of a lid connection part and a packing on the lid of the pot of the present invention.

Also, an inverse overflow cut-off flange 60 extending from the lower side of the insert flute 22 cuts off boiled contents of the vessel 10, thereby soup etc which boils up, is arrested and confined and prevented in boiling over vessel 10. The packing 510 is constructed with an elastic synthetic resin or rubber material capable of enduring high heat. As shown in FIG. 4, the sectional shape of packing 510 has a side wall 511 inserted into the insert flute 22 of the lid 20 which closely adheres to the projection jaw 23, a sealing plate 512 projects in an outer direction from side wall 511, to cut off a flow-in of air from the outer side, and a cut-off plate 513 formed together with the side wall 511 below the sealing plate 512, for reinforcing a sealing function and restraining the overflow of the contents.

Figure 5:
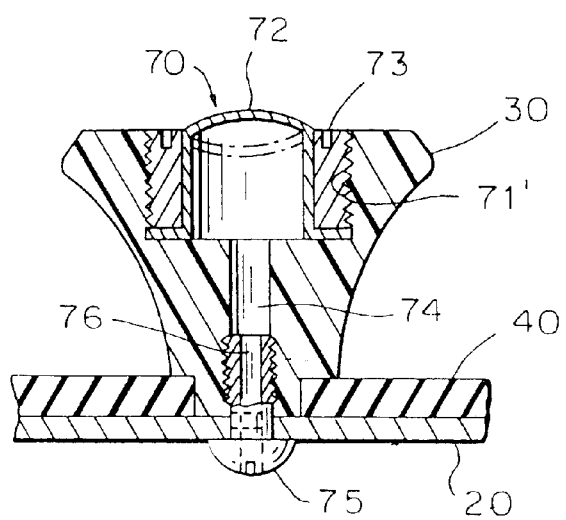
FIG. 5 is a partial sectional view showing a seal indication structure for checking a sealed state of the pot of the present invention.

It is more preferable that the lid 20 is constructed of transparent material so as to confirm the contents within the vessel 10. As shown in FIGS. 1 and 5, in a seal indication structure 70, in a center of an upper face of the knob 30 a fixing hole 71 having a female screw thread 71' is formed therein, and into the fixing hole 71 an indication cap 72 of ductile material is inserted, then it is fixed by using a bolt 73 of a ring shape. In the center of a bottom of the fixing hole 71 a tube hole 74 pierced through the projected rod 31 is formed, and in the center of the assembly screw 75 inserted into the tube hole 74 a venting hole 76 is pierced so that the fixing hole 71 can be connected and penetrated to the interior of the vessel 10. The above vessel 10, lid 20, open seal part 40 and sealing part 50 etc. are not limited to the above-mentioned structure but any equivalent structure obtaining the same effect as above-mentioned may be used.

In accordance with the present invention having such the construction, when heating food material in the pot of the invention with the lid 20 installed on vessel 10, and a packing 510 set on the outer circumference face of the lid 20 adhering closely to the slant face 11 of the vessel 10 as showing in FIG. 4 in order to cut off air ventilation from the outside, wherein the sealing plate 512 and the cut-off plate 513 closely adhere to the slant face 11 a more perfect cut-off effect can be achieved.

The open seal part 40 installed on the lid 20 adheres closely to the upper face of the lid 20 by elastic force to cut off the exhaust holes 21. In the state the lid 20 is installed on the upper part of the vessel 10 and the air ventilation from the outside is cut off, if the pot is heated and temperature of the pot interior rises and the high pressure pushes the open seal part 40 open to the vessel 10 interior, the high pressure pushes out the open seal part 40 through the exhaust hole 21 and executes an exhaust operation. When the high pressure is larger than an exhaust speed, the high pressure pushes up whole of the lid 20, thereby the sealing part 50 is opened to exhaust the high pressure smoothly.

Accordingly, by the exhaust of the high pressure within the vessel 10, the heating can be executed in the same method as the conventional one. After heating, the lid 20 is not opened and the temperature of the vessel 10 interior cools gradually and lowers pressure. The open seal part 40 whose outer circumference face rises upwards by a high pressure so as to open the exhaust holes 21, returns to an original state by a gradual loss of the pressure and then adheres closely to the upper face of the lid 20. Therefore, the exhaust holes 21 are cut off.

The sealing part 50 between the vessel 10 and the lid 20 permits the pressure within the vessel 10 to change to a lower pressure in the vessel 10 interior which sucks the lid 20 to the vessel 10 side. Therefore, the outer circumference face of the lid 20 adheres more closely to the upper outer circumference face of the vessel 10, thereby the sealing plate 512 and the cut off plate 513 of the packing 510 adhere more closely to the slant face 11 of the vessel 10 so as not to leak, keeping a perfect closeness. This lower pressure communicates with the fixing hole 71 through the tube hole 74 and the venting hole 76 of the assembly screw 75, and sucks an upper face of the indication cap 72 as shown by dotted line in FIG. 5 so that the sealed state can be easily identified from outside the pot. Also, the open seal part 40 adheres closely to the upper face of the lid 20 so that the outer air cannot flow into the vessel 10 and speed decomposition of food inside.

Therefore, by the cut-off of the air ventilation between the atmosphere and the pot, the food within the pot cannot be oxidized and is not decomposed in spite of the storing for a long time. When the pressure inside is lowered vessel 10, and the vessel 10 and the lid 20 are adhered together by the open seal part 40 and the sealing part 50, air in the atmosphere is precluded from the inside.

When the food material within the vessel 10 is boiled, the inverse overflow cut-off flange 60 executes a confining role by surrounding the boiled food material moved to an edge of the pot, so most food material cannot be moved to the slant face 11 side of the vessel 10. Only a very small quantity of contents, which is boiling near the edge of the vessel 10 of the inverse overflow cut-off flange 60 outer side, rises to the slant face 11 side. This is cut off by the cut-off plate 513 so as not to permit flow outside the vessel 10. This prevents staining of the vessel 10.

In case of opening the heated lid 20, by pulling up the handle part 41 of the open seal part 40 as showing in FIG. 3, the exhaust holes 21 are opened to the outside and the pressure between the vessel 10 inside and the atmosphere becomes same, thereby the lid 20 can be easily separated from the vessel 10. Also by forming numerous number of inflow holes 42 of the concave circle shape on the lower face off the open seal part 40, in case the open seal part 40 is moved upwards, air flows in the inflow hole 42, and thereby the lower face of the open seal part 40 can be smoothly separated from the upper face of the lid 20. Also, a staining substance on the upper face of the lid 20 is contained in the inflow hole 42 interior so that the open seal part 40 can adhere closely to the upper face of the lid 20 exactly.

Meanwhile, in order to separate the lid 20, the open seal part 40 is lifted so that the pressure within the vessel 10 can be same as the pressure of the atmosphere, the indication cap 72 of the seal indication structure 70 returns to its original position as shown in FIG. 5 by elastic force, and without opening the lid 20, it can be seen whether lid 20 is sealed or not.

The knob, the sealing part, the open seal part and the seal indication part are respectively installed on lid 20, and the high pressure generated by boiling in vessel 10 is exhausted automatically. When the temperature of the pot falls and air within the vessel shrinks, the lower pressure seals the pot. Therefore the contents can be kept for a long time without decomposition due to the cut-off of air ventilation from the outside. By the seal indication structure furthermore, the sealing state of the pot inside can be easily determined from the outside even without opening the lid, thereby increasing its convenience.

It will be apparent to those skilled in the art that various modifications and variations can be made in the pot having the automatic sealing function of the present invention without departing from the spirit or scope of the invention. Thus, it is intended that the present invention cover the modifications and variations of this invention provided they come within the scope of the appended claims and their equivalents.

What is claimed:

1. A pot having an automatic sealing function, for cooking food material; the pot having a lid with a knob installed on an open upper part of a vessel, said pot comprising:

an elastic open seal part installed between the lid and the knob which permits a high pressure generated by heating said pot to be automatically exhausted, and precluding an inflow of exterior air into said pot when cooled, wherein the interior of the pot is automatically sealed;

a sealing part installed between said vessel and said lid; and an inverse outflow cut-off flange installed on a lower part of the lid for restraining an outflow of the food material to an exterior of the vessel when contents therein are boiled.

2. The pot according to claim 1, wherein a plurality of exhaust holes are formed through said lid which are opened and closed by said open seal part.

3. The pot according to claim 1, wherein a circular handle part is formed on an outer circumference of said open seal part which slants upwards.

4. The pot according to claim 1, wherein a plurality of concave recesses are provided on a lower face of said open seal part.

5. The pot according to claim 1, wherein said sealing part comprises; a surface engaged an upper end of the vessel which slants outward from the vessel and a projection jaw formed on the lower face of an outer circumference of the lid so that an insert flute of a circular shape is formed, and wherein said pot is sealed by a weight of the lid and pressure a packing in said insert flute.

6. The pot as claimed in claim 5, wherein said inverse outflow cut-off flange is formed with said projection jaw and below said insert flute, a lower end of said inverse outflow cut-off flange being below the upper end of the vessel engaged to said slant face.

7. The pot according to claim 5, wherein the packing has a side wall inserted into the insert flute of the lid and closely engaged to the projection jaw, a sealing plate formed on an outer side face of said side wall and closely engaged to the slant face, and a cut-off plate formed on the outer side face of the side wall below said sealing plate and also closely engaged to the slant face.

8. The pot according to claim 1, further comprising a seal indication structure installed in said knob so that a sealing state of said pot can be easily determined outside the pot without opening the lid.

9. The pot according to claim 8, wherein said seal indication structure comprises a fixing hole having a female screw thread formed in a center of an upper face of the knob, an indication cap of ductile material inserted into said fixing hole and fixed by a circular bolt screwed into said female screw thread, a tube hole which pierces through a projected rod formed in a center of a bottom of said fixing hole, and a venting hole piercing through the center of an assembly screw inserted into said tube hole to fix the lid to the knob, wherein said fixing hole communicates with an interior of the vessel.

10. The pot according to claim 3 wherein said circular handle part and said open seat part are a unitary element.

11. The pot according to claim 6, wherein said lid, said inverse outflow cut-off flange, said projection jaw and said insert flute are a unitary element.

* * * * *